US012511249B2

United States Patent
Lee (10) Patent No.: US 12,511,249 B2
(45) Date of Patent: Dec. 30, 2025

(54) MEMORY CONTROLLER, SOLID-STATE STORAGE DEVICE, AND METHOD FOR MONITORING LINK SIGNAL QUALITY OF SOLID-STATE STORAGE DEVICE

(71) Applicant: SILICON MOTION INC., Zhubei (TW)

(72) Inventor: Chun-Cheng Lee, Zhubei (TW)

(73) Assignee: SILICON MOTION INC., Hsinchu County (TW)

( * ) Notice: Subject to any disclaimer, the term of this patent is extended or adjusted under 35 U.S.C. 154(b) by 0 days.

(21) Appl. No.: 18/731,071

(22) Filed: May 31, 2024

(65) Prior Publication Data
US 2025/0231901 A1  Jul. 17, 2025

(30) Foreign Application Priority Data
Jan. 17, 2024  (TW) .................................. 113101795

(51) Int. Cl.
*G06F 13/42* (2006.01)
*G06F 13/16* (2006.01)

(52) U.S. Cl.
CPC .......... *G06F 13/4221* (2013.01); *G06F 13/16* (2013.01); *G06F 2213/0026* (2013.01); *G06F 2213/16* (2013.01)

(58) Field of Classification Search
CPC .. G06F 13/4221; G06F 13/16; G06F 2213/16; G06F 2213/0026
See application file for complete search history.

(56) References Cited

U.S. PATENT DOCUMENTS

| | | | |
|---|---|---|---|
| 8,817,643 B1* | 8/2014 | Sun ...................... | H04W 24/04 370/252 |
| 11,960,723 B2* | 4/2024 | Reddy ................... | G06F 3/0607 |
| 2012/0106413 A1* | 5/2012 | Huang .................... | H04L 69/22 370/310 |
| 2016/0070486 A1* | 3/2016 | Anderson ................ | G06F 9/44 711/103 |
| 2017/0116093 A1* | 4/2017 | Arroyo ............... | G06F 11/2005 |

(Continued)

FOREIGN PATENT DOCUMENTS

| | | |
|---|---|---|
| CN | 1851678 A | 10/2006 |
| CN | 103077148 A | 5/2013 |

(Continued)

*Primary Examiner* — Henry Tsai
*Assistant Examiner* — Christopher A Daley
(74) *Attorney, Agent, or Firm* — Duane Morris LLP (57) ABSTRACT

A method for monitoring link signal quality of a solid-state storage device is provided. The method includes the following steps: utilizing a PCIe media access control (MAC) layer to trigger an error notification signal in response to an error occurring on data transmission on a PCIe bus between a host and the solid-state storage device; utilizing a link quality monitoring circuit to transmit a first or second error count signal to an error counter circuit based on a transmission direction of the data transmission in response to the error notification signal; utilizing the error counter circuit to accumulate a first or second error count value based on the first or second error count signal; and utilizing the PCIe MAC layer to report the first or second error count value to the host through the PCIe bus in response to a configuration read packet from the host.

20 Claims, 7 Drawing Sheets

(56) References Cited

U.S. PATENT DOCUMENTS

| | | |
|---|---|---|
| 2017/0249201 A1 | 8/2017 | Yi |
| 2020/0249275 A1* | 8/2020 | Froelich ................ G06F 11/273 |
| 2022/0200712 A1* | 6/2022 | Lillie .................. H04L 43/0811 |
| 2022/0327074 A1* | 10/2022 | Jeon ...................... G06F 1/3275 |
| 2022/0382362 A1* | 12/2022 | Yang ..................... G06F 1/3225 |
| 2022/0400089 A1* | 12/2022 | Hache ................. G06F 13/4022 |
| 2024/0036960 A1* | 2/2024 | Vui ..................... G06F 13/4221 |
| 2024/0231996 A1* | 7/2024 | Monserrat ........... G06F 11/0769 |

FOREIGN PATENT DOCUMENTS

| | | |
|---|---|---|
| CN | 117118924 A | 11/2023 |
| TW | 202311973 A | 3/2023 |

\* cited by examiner

MEMORY CONTROLLER, SOLID-STATE STORAGE DEVICE, AND METHOD FOR MONITORING LINK SIGNAL QUALITY OF SOLID-STATE STORAGE DEVICE

CROSS REFERENCE TO RELATED APPLICATION

The present application is based on, and claims priority from Taiwan Application Serial Number 113101795, filed Jan. 17, 2024, the disclosure of which is hereby incorporated by reference herein in its entirety.

BACKGROUND OF THE DISCLOSURE

1. Field of the Disclosure

The present disclosure relates to integrated circuits, and in particular, to a memory controller, a solid-state storage device, and a method for monitoring link signal quality of a solid-state storage device.

2. Description of the Related Art

In today's computer systems, a host and a solid-state storage device can be electrically connected to each other through a peripheral component interconnect express (PCIe) bus. Although data transmission between the host and the solid-state storage device can be performed through the PCIe bus, the host is unable to determine the link quality of the PCIe bus. The host often can only detect and take corresponding actions when the signal quality of the links in the PCIe bus deteriorates to the point of disconnection, resulting in a decrease in user experience.

SUMMARY OF THE DISCLOSURE

Hence, the present disclosure provides a memory controller, a solid-state storage device, and a method for monitoring link signal quality of a solid-state storage device to resolve the aforementioned problem.

An aspect of the present disclosure provides a memory controller, which is electrically connected to a host through a peripheral component interconnect express (PCIe) bus. The memory controller includes a PCIe media access control (MAC) layer, a non-volatile memory express (NVMe) conversion circuit, a flash memory control circuit, a link quality monitoring circuit, and an error counter circuit. The PCIe MAC layer is configured to trigger an error notification signal in response to an error of data transmission on the PCIe bus. The NVMe conversion circuit is configured to convert a PCIe signal from the PCIe MAC layer into an NVMe signal. The flash memory control circuit is configured to control data access of a flash memory based on the NVMe signal. The link quality monitoring circuit is electrically connected to the flash memory control circuit and the PCIe MAC layer. The link quality monitoring circuit is configured to generate a first error count signal or a second error count signal based on a transmission direction of the data transmission in response to the error notification signal. The error counter circuit is electrically connected to the link quality monitoring circuit, and is configured to accumulate a first error count value or a second error count value based on the first error count signal or the second error count signal. In response to a configuration read packet with a specific address from the host, the error counter circuit is configured to load the first error count value or the second error count value into a first register or a second register of the PCIe MAC layer, and the PCIe MAC layer reports the first error count value or the second error count value to the host through the PCIe bus.

Another aspect of the present disclosure further provides a method for monitoring link signal quality of a solid-state storage device. The solid-state storage device is electrically connected to a host through a PCIe bus, and a memory controller of the solid-state storage device includes a PCIe MAC layer, a flash memory control circuit, a link quality monitoring circuit, and an error counter circuit. The method includes the following steps: utilizing the PCIe MAC layer to trigger an error notification signal in response to an error of data transmission on the PCIe bus between the host and the solid-state storage device; utilizing the link quality monitoring circuit to transmit a first error count signal or a second error count signal to the error counter circuit based on a transmission direction of the data transmission in response to the error notification signal; utilizing the error counter circuit to accumulate a first error count value or a second error count value based on the first error count signal or the second error count signal; and utilizing the PCIe MAC layer to report the first error count value or the second error count value to the host through the PCIe bus in response to a configuration read packet from the host.

Yet another aspect of the present disclosure further provides a solid-state storage device, which is electrically connected to a host through a peripheral component interconnect express (PCIe) bus. The solid-state storage device includes a flash memory and a memory controller electrically connected to the flash memory. The memory controller includes a PCIe media access control (MAC) layer, a non-volatile memory express (NVMe) conversion circuit, a flash memory control circuit, a link quality monitoring circuit, and an error counter circuit. The PCIe MAC layer is configured to trigger an error notification signal in response to an error of data transmission on the PCIe bus. The NVMe conversion circuit is configured to convert a PCIe signal from the PCIe MAC layer into an NVMe signal. The flash memory control circuit is configured to control data access of a flash memory based on the NVMe signal. The link quality monitoring circuit is electrically connected to the flash memory control circuit and the PCIe MAC layer. The link quality monitoring circuit is configured to generate a first error count signal or a second error count signal based on a transmission direction of the data transmission in response to the error notification signal. The error counter circuit is electrically connected to the link quality monitoring circuit, and is configured to accumulate a first error count value or a second error count value based on the first error count signal or the second error count signal. In response to a configuration read packet with a specific address from the host, the error counter circuit is configured to load the first error count value or the second error count value into a first register or a second register of the PCIe MAC layer, and the PCIe MAC layer reports the first error count value or the second error count value to the host through the PCIe bus.

PREFERRED EMBODIMENT OF THE PRESENT DISCLOSURE

The following descriptions are preferred implementations of the present disclosure, and a purpose thereof is to describe the basic spirit of the present disclosure, but is not intended to limit the present disclosure. For the actual disclosure content, reference should be made to the following scope of the patent application.

It should be understood that words such as "include" and "comprise" used in this specification are used to indicate existence of specific technical features, values, method steps, operations and processing, elements, and/or components, but do not exclude more technical features, values, method steps, operations and processing, elements, components, or any combination of the above.

Words such as "first", "second", and "third" used in the scope of patent application are used to modify elements within the scope of patent application, but are not intended to indicate that a priority order or a precedence relationship exists between the elements, or that one element precedes another, or that a time order during performing of the method steps is only used to distinguish between the elements with the same name.

A term "configured to" may be used to describe or claim that various units, circuits, or other components are "configured to" perform one or more tasks. In such a context, the term "configured to" is used to imply a structure by indicating that the unit/circuit/component includes a structure (for example, a circuit system) that performs (one or more) tasks during operation. Therefore, even if a specified unit/circuit/component is not currently operating (for example, not turned on), it may still be considered that the unit/circuit/component is configured to perform the task. The unit/circuit/component used in combination with the term "configured to" includes hardware, for example, a circuit and a memory (which stores an executable program instruction to implement an operation). In addition, "configured to" may include a generic structure (for example, a general-purpose circuit system) that is manipulated by software and/or firmware (for example, an FPGA or a general-purpose processor executing software) to operate in a way that (one or more) to-be-resolved tasks can be performed. The "configured to" may also include adapting a manufacturing program (for example, semiconductor manufacturing equipment) to manufacture a device (for example, an integrated circuit) that is adapted to implement or perform one or more tasks.

Figure 1:
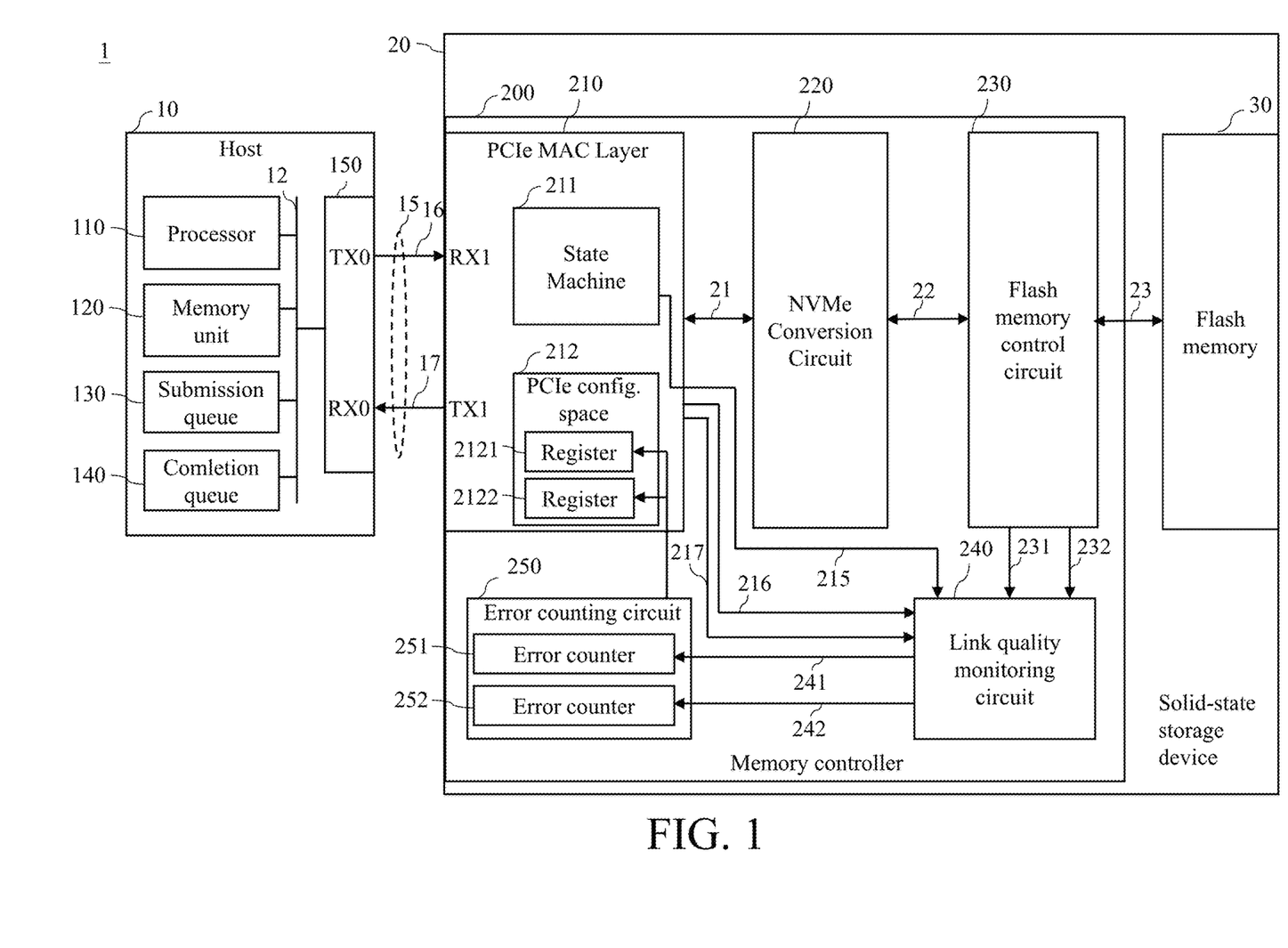
FIG. 1 is a block diagram of a computer system according to an embodiment of the present disclosure.

FIG. 1 is a block diagram of a computer system according to an embodiment of the present disclosure.

As shown in FIG. 1, a computer system 1 may include a host 10 and a solid-state storage device 20, and the host 10 is electrically connected to the data storage device 20 through a peripheral component interconnect express (PCIe) bus 15. To be specific, the host 10 and the solid-state storage device 20 may perform data transmission through a link 16 and a link 17 of the PCIe bus 15. The link 16 is, for example, from a transmitter terminal TX0 of the host 10 to a receiver terminal RX1 of the solid-state storage device 20. The link 17 is, for example, from a transmitter terminal TX1 of the solid-state storage device 20 to a receiver terminal RX0 of the host 10.

In some embodiments, the host 10 may include a processor 110, a memory unit 120, a submission queue 130, a completion queue 140, and a transmission interface 150, and the processor 110, the memory unit 120, the submission queue 130, the completion queue 140, and the transmission interface 150 are electrically connected to each other through a bus 12. The processor 110 may include a central processing unit, a general-purpose processor, a microprocessor, and the like, but the present disclosure is not limited thereto. The memory unit 120 may include a volatile memory and a non-volatile memory. The volatile memory may include, for example, a dynamic random access memory (DRAM) and/or a static RAM (SRAM), which may serve as a data register of an access command of a system memory and the host 10. The non-volatile memory may include, for example, a hard disk drive, a flash memory, a read-only memory, an SD card, a ferroelectric RAM (Fe-RAM), and a resistive RAM (RRAM), but the present disclosure is not limited thereto.

The submission queue 130 and the completion queue 140 may be volatile memories, which is implemented using a SRAM, a register, or a first-in first-out memory, but the present disclosure is not limited thereto. The submission queue 130 may be configured to record an access command transmitted by the processor 110. The completion queue 140 may be configured to record a state of a completed access command responded by the solid-state storage device 20. The transmission interface 150 may be, for example, a PCIe physical layer (PHY), which includes the transmitter terminal TX0 and the receiver terminal RX0.

In some embodiments, the solid-state storage device 20 may include a memory controller 200 and a flash memory 30. The memory controller 200 is electrically connected to the flash memory 30 and configured to control data access of the flash memory 30. The memory controller 200 may be, for example, an integrated circuit, which supports the PCIe protocol and the non-volatile memory express (NVMe). The flash memory 30 may be, for example, a NAND flash memory. The memory controller 200 may include a PCIe media access control (MAC) layer 210, an NVMe conversion circuit 220, a flash memory control circuit 230, a link quality monitoring circuit, and an error counter circuit 250. The PCIe MAC layer 210 is, for example, a collective term for various circuits and registers with different functions, which includes data transmission interfaces (for example, a transmitter terminal TX1 and a receiver terminal RX1) of the PCIe PHY (not shown), a state machine 211, a PCIe configuration space 212, and other general control circuits (not shown). The PCIe MAC layer 210 may receive a control signal and data from the host 10 through link 16, and convert the control signal and data into a PCIe signal 21. The NVMe conversion circuit 220 may be configured to convert the PCIe signal 21 from the PCIe MAC layer 210 into an NVMe signal 22, or convert the NVMe signal 22 from the flash memory control circuit 230 into the PCIe signal 21. The flash memory control circuit 230 may be configured to generate a flash memory interface signal 23 based on the NVMe signal 22, so as to control data access of the flash memory 30. For operations of a link quality monitoring circuit 240 and the error counter circuit 250, reference is made to an embodiment of FIG. 2.

Figure 2:
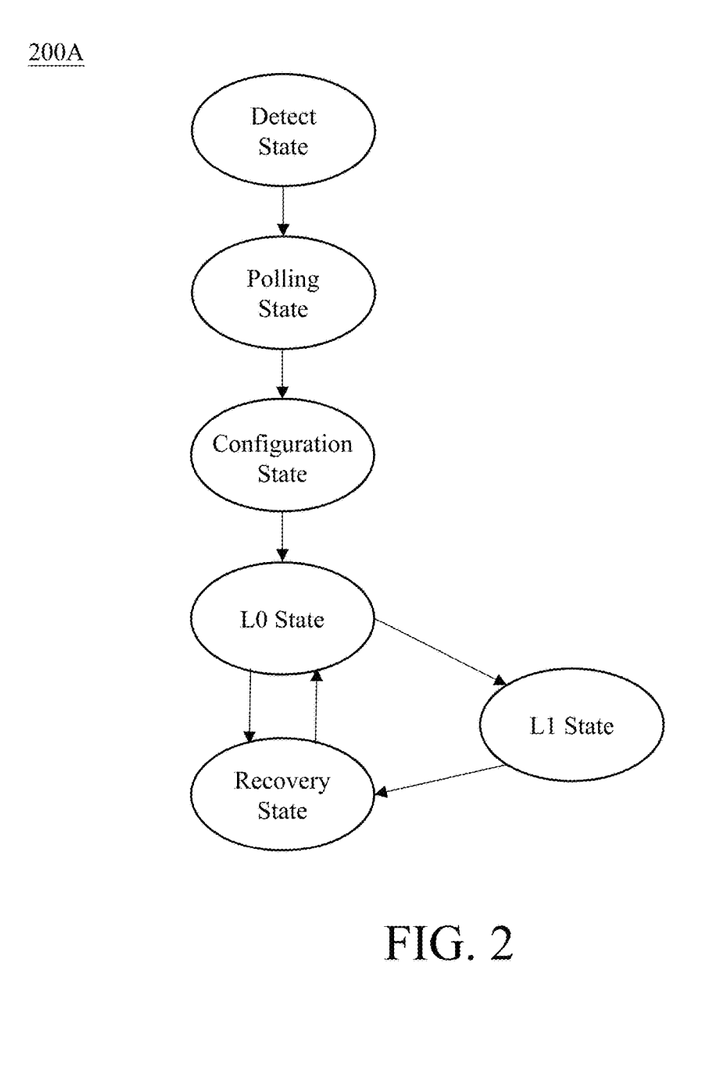
FIG. 2 is a state diagram showing a state machine in the embodiment of FIG. 1 according to the present disclosure.

FIG. 2 is a state diagram showing a state machine 211 in an embodiment of FIG. 1 according to the present disclosure.

In some embodiments, the state machine 211 may be a link training and status state machine (LTSSM) defined in the PCIe standard, and configured to perform initialization and training of links 16 and 17 of the PCIe bus 15. The state machine 211 may include 11 states, such as a detect state, a polling state, a configuration state, a recovery state, an L0 state, an L0s state, an L1 state, an L2 state, a hot reset state, a loopback state, and a disable state. For ease of description, a state diagram 200A shown in FIG. 2 is a simplified state diagram, which only includes the detect state, the polling state, the configuration state, the L0 state, the recovery state, and the L1 state.

Before links 16 and 17 can operate normally, link training needs to be performed on them using the state machine 211. The transition process of the PCIe link training states usually includes the detect state, the polling state, the configuration state, and the L0 state in sequence. The L0 state may be referred to as a normal transmission state, indicating that links 16 and 17 are in a power state where they may transmit data normally. For the solid-state storage device 20, link 17 may be, for example, from a transmitter terminal TX1 of the solid-state storage device 20 to a receiver terminal RX0 of the host 10, which has a first transmission direction. On the other hand, link 16 may be, from a transmitter terminal TX0 of the host 20 to a receiver terminal RX1 of the solid-state storage device 10, which has a second transmission direction. A data transmission direction between the host 10 and the solid-state storage device 20 is related to an access command fetched from the submission queue 130 of the host 10 and executed by the solid-state storage device 20. The aforementioned access command may be a write command or a read command.

In detail, when the processor 110 of the host 10 wants to write data to the solid-state storage device 20, the processor 110 submits the write command to the submission queue 130, and stores the write data corresponding to the write command in the memory unit 120. When the processor 110 of the host 10 wants to read data from the solid-state storage device 20, the processor 110 submits the corresponding read command to the submission queue 130. The memory controller 200 may periodically check a submission status of the submission queue 130 (e.g., through a doorbell register) to fetch the submitted access command from the submission queue 130. Therefore, the memory controller 200 may know a data transmission direction of the access command to be executed. After the memory controller 200 completes the execution of the access command, the memory controller 200 writes the command completion information of the access command to the completion queue 140 of the host 10 through link 17. Therefore, the processor 110 may read the completion queue 140 to know that the access command has been executed by the solid-state storage device 20.

In some embodiments, when the access instruction fetched by the memory controller 200 from the submission queue 130 is a read command, the memory controller 200 may transmit the read data obtained from the flash memory 30 to the host 10 in the first transmission direction through link 17 during execution of the read command. When the access command fetched by the memory controller 200 from the submission queue 130 is a write command, the memory controller 200 transmits write data stored in the memory unit 120 corresponding to the write command to the memory controller 200 in the second transmission direction through link 16 during execution of the write command. In addition, both the PCIe MAC layer 210 and the flash memory control circuit 230 in the memory controller 200 may know the transmission direction of data transmission of the access command currently executed by the memory controller 200.

In some embodiments, when the aforementioned transmission direction is the first transmission direction, signals 216 and 217 transmitted from the PCIe MAC layer 210 to the link quality monitoring circuit 240 may be, for example, in a high logic state and a low logic state, respectively. Additionally, signals 231 and 232 transmitted from the flash memory control circuit 230 to the link quality monitoring circuit 240 may be, for example, in the high logic state and the low logic state, respectively. When the aforementioned transmission direction is the second transmission direction, the signals 216 and 217 transmitted from the PCIe MAC layer 210 to the link quality monitoring circuit 240 may be, for example, in the low logic state and the high logic state, respectively. Additionally, the signals 231 and 232 transmitted from the flash memory control circuit 230 to the link quality monitoring circuit 240 may be, for example, in the low logic state and the high logic state, respectively.

Figure 5:
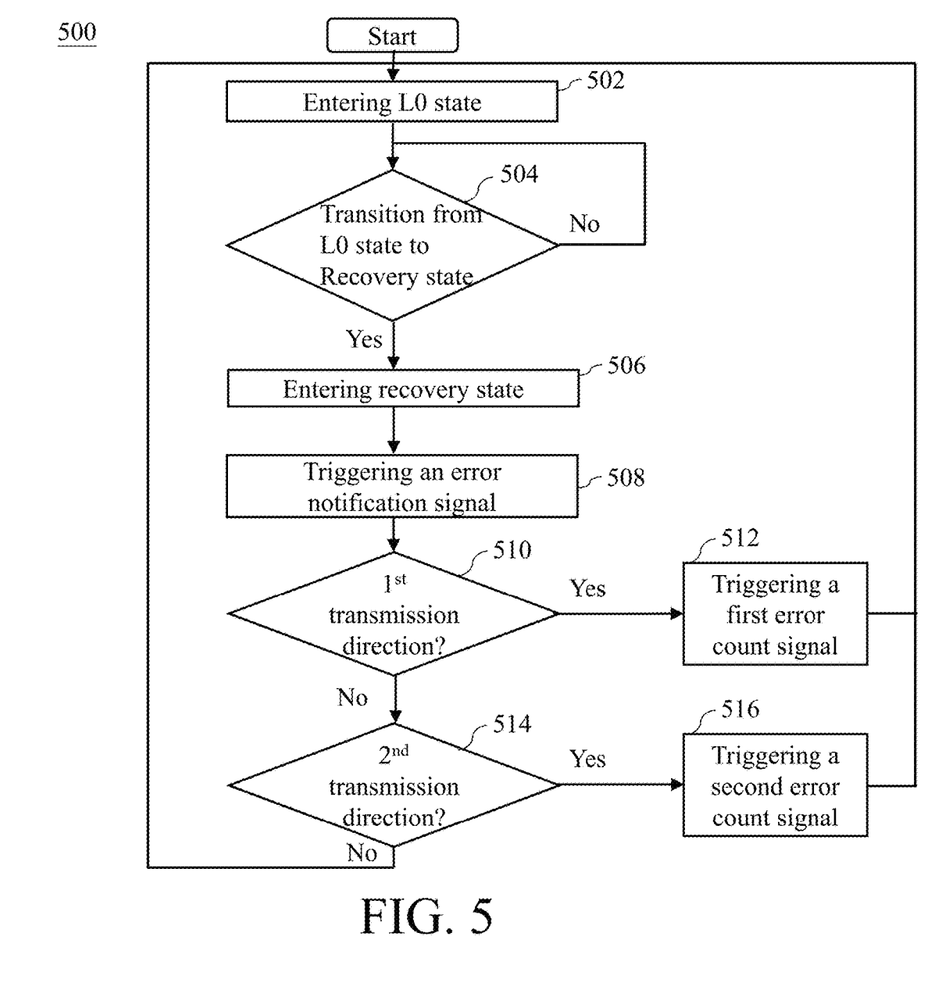
FIG. 5 a flowchart of triggering an error notification signal and generating an error count signal according to an embodiment of the present disclosure.

In some embodiments, the process of triggering an error notification signal and generating an error count signal by the memory controller 200, can refer to flow 500 shown in FIG. 5. First, the solid-state storage device 20 may enter the L0 state to perform data transmission with the host 10 (step 502). The state machine 211 of the PCIe MAC layer 210 may continuously detect whether the data transmitted on link 16 or 17 has errors. When the PCIe MAC layer 210 detects that the data transmitted on link 16 or 17 has errors, the solid-state storage device 20 may switch from the L0 state to the recovery state. Therefore, the PCIe MAC layer 210 may detect whether the solid-state storage device 20 switches from the L0 state to the recovery state (step 504). If so, the solid-state storage device 20 enters the recovery state (step 506). If not, the flow 500 returns to step 504.

After the solid-state storage device 20 switches from the L0 state to the recovery state, the state machine 211 may trigger an error notification signal 215 (step 508), and transmit the error notification signal 215 to the link quality monitoring circuit 240. The error notification signal 215 may be, for example, a pulse signal. In some cases, the solid-state storage device 20 may enter the L1 state from the L0 state. The L1 state may be, for example, a low power consumption state. When the solid-state storage device 20 wants to recover from the L1 state to the L0 state, the solid-state storage device 20 may first enter the recovery state from the L1 state. After the PCIe MAC layer 210 completes retraining of links 16 and 17 in the recovery state, the solid-state storage device 20 may return from the recovery state to the L0 state to start performing data transmission through link 16 or 17. It should be noted that when the solid-state storage device 20 switches from the recovery state to the L0 state, the state machine 211 does not trigger the error notification signal 215. To be specific, when the PCIe MAC layer 210 detects an error in a data packet transmitted on link 16 or 17, the error notification signal 215 is only triggered when the solid-state storage device 20 switches from the L0 state to the recovery state. The error notification signal 215 is not triggered by any other state transition situation.

In response to the error notification signal 215, the link quality monitoring circuit 240 determines, based on the logic states of the signals 231 and 232 (or the signals 216 and 217), whether a current transmission direction is the first transmission direction or the second transmission direction to trigger a first error count signal 241 or a second error count signal 242. The first error count signal 241 or the second error count signal 242 may be, for example, a pulse signal. In detail, the link quality monitoring circuit 240 may first determine whether the current transmission direction is the first transmission direction (step 510). When the link quality monitoring circuit 240 receives the error notification signal 215, if the signal 231 and the signal 232 are respectively in the high logic state and the low logic state, it indicates that the memory controller 200 transmits data read from the flash memory 30 to the host 10 in the first transmission direction through link 17. In this case, the link quality monitoring circuit 240 may trigger the first error count signal 241 (step 512), and transmit the first error count signal 241 to the error counter circuit 250. An error counter 251 (e.g., a TX error counter) in the error counter circuit 250 may accumulate a first error count value (e.g., a TX error count value) based on the first error count signal 241.

Subsequently, the link quality monitoring circuit 240 may determine whether the current transmission direction is the second transmission direction (step 514). When the link quality monitoring circuit 240 receives the error notification signal 215, if the signal 231s and 232 are respectively in the low logic state and the high logic state, it indicates that the memory controller 200 fetches the write data from the memory unit 120 of the host 10 in the second transmission direction through link 16. In this case, the link quality monitoring circuit 240 may trigger the second error count signal 242 (step 516), and transmit the second error count signal 242 to the error counter circuit 250. The error counter 252 (e.g., an RX error counter) in the error counter circuit 250 may accumulate a second error count value (e.g., an RX error count value) based on the second error count signal 242.

Figure 3:
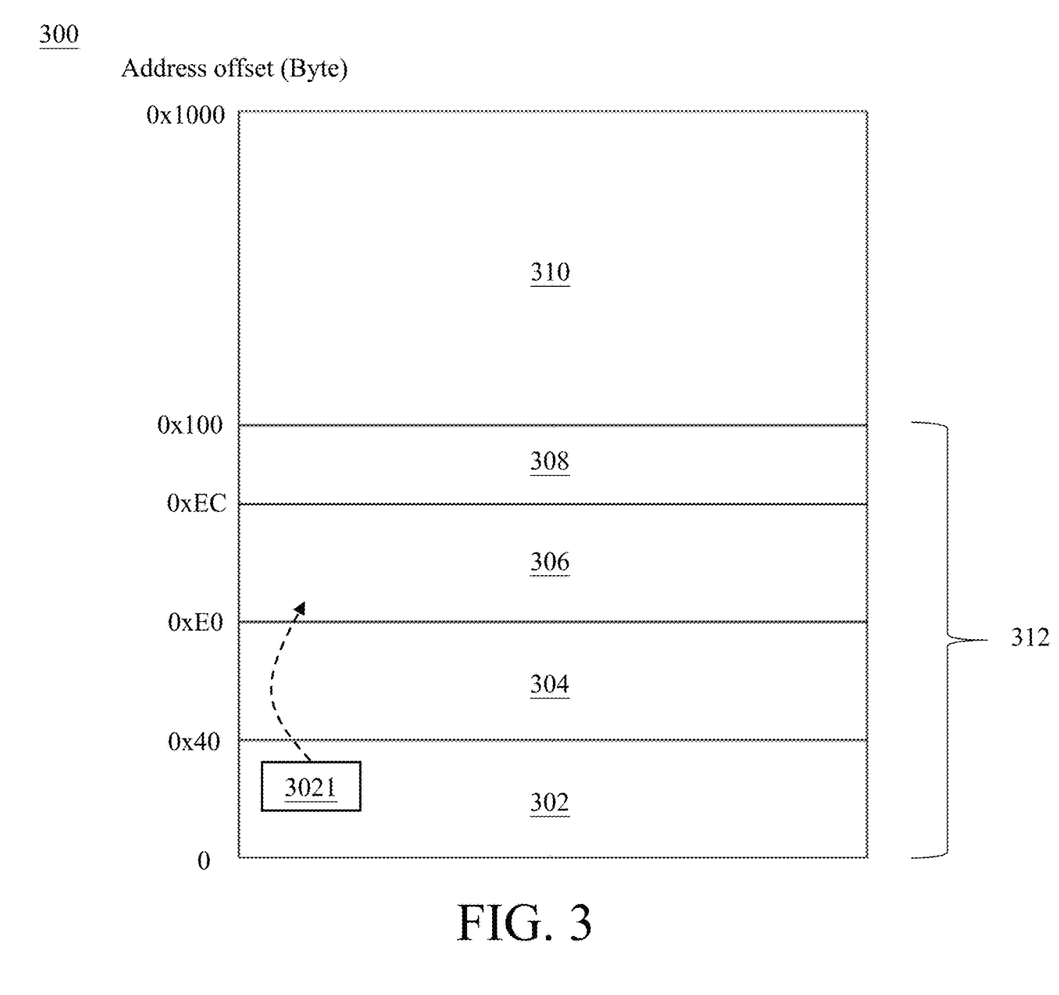
FIG. 3 is a diagram of a peripheral component interconnect express (PCIe) configuration space of a solid-state storage device according to an embodiment of the present disclosure.
Figure 4:
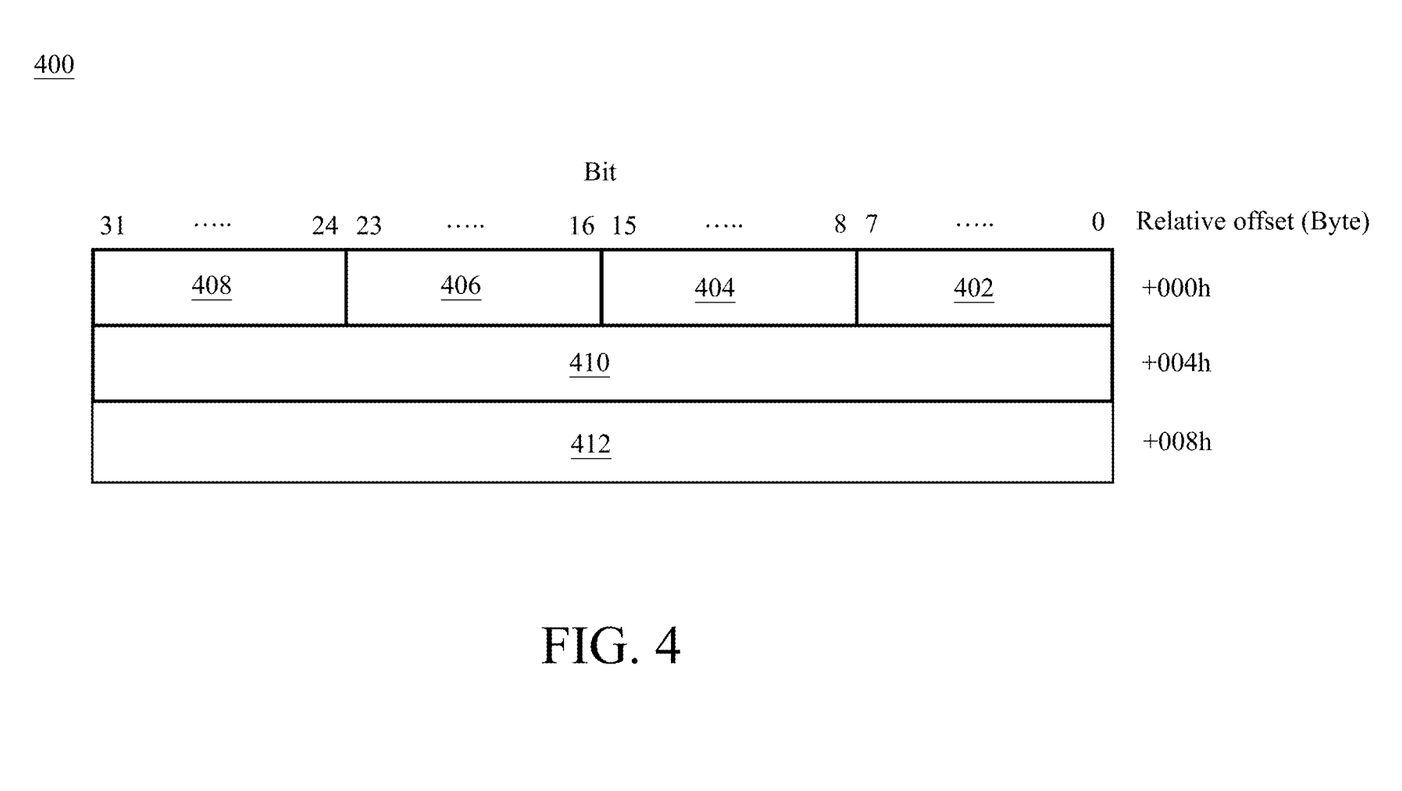
FIG. 4 is a diagram of a vendor capability structure according to an embodiment of the present disclosure.

FIG. 3 is a schematic diagram of a PCIe configuration space of a solid-state storage device according to an embodiment of the present disclosure. FIG. 4 is a schematic diagram of a PCIe capability structure according to an embodiment of the present disclosure.

In some embodiments, a PCIe MAC layer 210 of a solid-state storage device 20 has a register set (not shown) to store a PCIe configuration space 212. The PCIe configuration space 212 may be represented by, for example, a PCIe configuration space 300 in FIG. 3. After PCIe links 16 and 17 between the host 10 and the solid-state storage device 20 are established, the host 10 may read setting values of the PCIe configuration space 212 of the solid-state storage device 20 from the memory controller 200 through PCIe bus 15 to know information about capabilities of the solid-state storage device 20, such as settings of supported capabilities, device identification, and power management. For ease of description, the solid-state storage device 20 may support a vendor-specific capability, and the host 10 may transmit a configuration read packet with a specific address through link 16 to the solid-state storage device 20 to read the first error count value or the second error count value, allowing the host 10 to know the link quality between the host 10 and the solid-state storage device 20, the details of which will be described later.

For example, the PCIe configuration space 300 may include a PCI configuration space 312 and a PCIe extension configuration space 310, as shown in FIG. 3. The PCI configuration space 312 may include a configuration space header 302 compatible with the PCI 3.0 standard, a configuration space 304, a configuration space 308, and a PCIe capability structure 306. It should be noted that the range of each configuration space in FIG. 3 may include the lower limit value of the address offset, but does not include the upper limit value. For example, the address offset range of the PCIe configuration space 300 is between 0 and 0xFFF (in hexadecimal). The address offset range of the configuration space header 302 is between 0 and 0x3F.

When the solid-state storage device 20 supports the vendor-specific capability, a state register associated with a capability list in the configuration space header 302 will be set to 1, and a capability pointer 3021 in the configuration space header 302 may record a start address offset of a specific PCIe capability structure (e.g., the PCIe capability structure 306). The aforementioned specific PCIe capability structure may further include a next capability pointer to provide a start address offset of a next specific PCIe capability structure. The PCIe capability structure 306 may be, for example, a 12-byte memory space, and the address offset range of the PCIe capability structure may be between 0x40 and 0xFF. For ease of description, the capability pointer 3021 in the configuration space header 302 may point to the PCIe capability structure 306 with a start address offset of 0xE0. To be specific, the address offset range of the PCIe capability structure 306 may be between 0xE0 and 0xEB.

In some embodiments, the PCIe capability structure 306 may be represented by a PCIe capability structure 400 in FIG. 4, which includes fields 402 to 412. Fields 402, 404, 406, and 408 may represent a capability ID, a next capability pointer, a capability length, and a type, respectively. In detail, after the host 10 completes reading settings of the configuration space header 302, the host 10 may send a configuration read packet with an address of 0xE0 based on the capability pointer 3021 in the configuration space header 302 to read double-word set values starting from 0xE0 in the PCIe capability structure 306, including the capability ID, the next capability pointer, the capability length, and the type, which are respectively represented by fields 402, 404, 406, and 408 in the PCIe capability structure 400 shown in FIG. 4. In some embodiments, the aforementioned configuration read packet may be, for example, a configuration read transaction layer packet defined in the PCIe protocol, but the present disclosure is not limited thereto.

For ease of description, numerical values recorded in fields 402 and 406 are 0x9 and 0x4, respectively. When the numerical value recorded in field 402 is 0x9, it indicates that the solid-state storage device 20 supports the vendor-specific capability. In this case, the PCIe capability structure 400 may also be referred to as a vendor-specific capability structure. When the numerical value recorded in field 406 is 0x4, it indicates that a length of the vendor-specific capability is 4 bytes. In addition, if the numerical value recorded in field 404 is 0, it indicates that the PCIe capability structure 400 does not point to another PCIe capability structure. If the numerical value recorded in field 404 is not 0, it indicates that the PCIe capability structure 400 points to a next PCIe capability structure with the numerical value recorded in field 404 as the start address offset. Therefore, the host 10 may transmit a configuration read packet having the address with the numerical value to the solid-state storage device 20 to read setting values of the next PCIe capability structure.

Accordingly, after the host 10 checks the set values in fields 402, 404, and 406 to determine that the solid-state storage device 20 supports a vendor-specific capability and its capability length, and whether a next PCIe capability structure is pointed to, the host 10 may recheck the setting value in field 408 to determine a type of the vendor-specific capability supported by the solid-state storage device 20.

Here, when the set value in field 408 is equal to a specific numerical value (e.g., 0x1), the host 10 may determine that the vendor-specific capability supported by the solid-state storage device 20 carries TX/RX link quality information.

In some embodiments, the host 10 may know, from the setting values of the configuration space header 302, that the start address offset of the PCIe capability structure 306 is 0xE0, and obtain double-word set values starting from the start address offset of 0xE0 of the PCIe capability structure 306, that is, 4 bytes starting from +000h (including the fields 402-408) shown in FIG. 4. The capability ID of field 402 is 0x9, the capability length of field 406 is 0x4, and the type of field 408 is 0x1. Therefore, the host 10 may learn that the solid-state storage device 20 supports the vendor-specific capability of reporting the TX/RX link quality information, and the PCIe capability structure 306 records a first 4-byte error count value (e.g., stored in register 2121) and a second 4-byte error count value (e.g., stored in register 2122). The first error count value may be, for example, a double-word setting value starting from 0xE4 (i.e., 4 bytes starting from +004h offset shown in FIG. 4), and the second error count value may be, for example, a double-word setting value starting from 0xE8 (i.e., 4 bytes starting from +008h offset shown in FIG. 4). The operation procedure of obtaining the TX/RX link quality information by the host 10 can be referred to FIG. 6.

Figure 6:
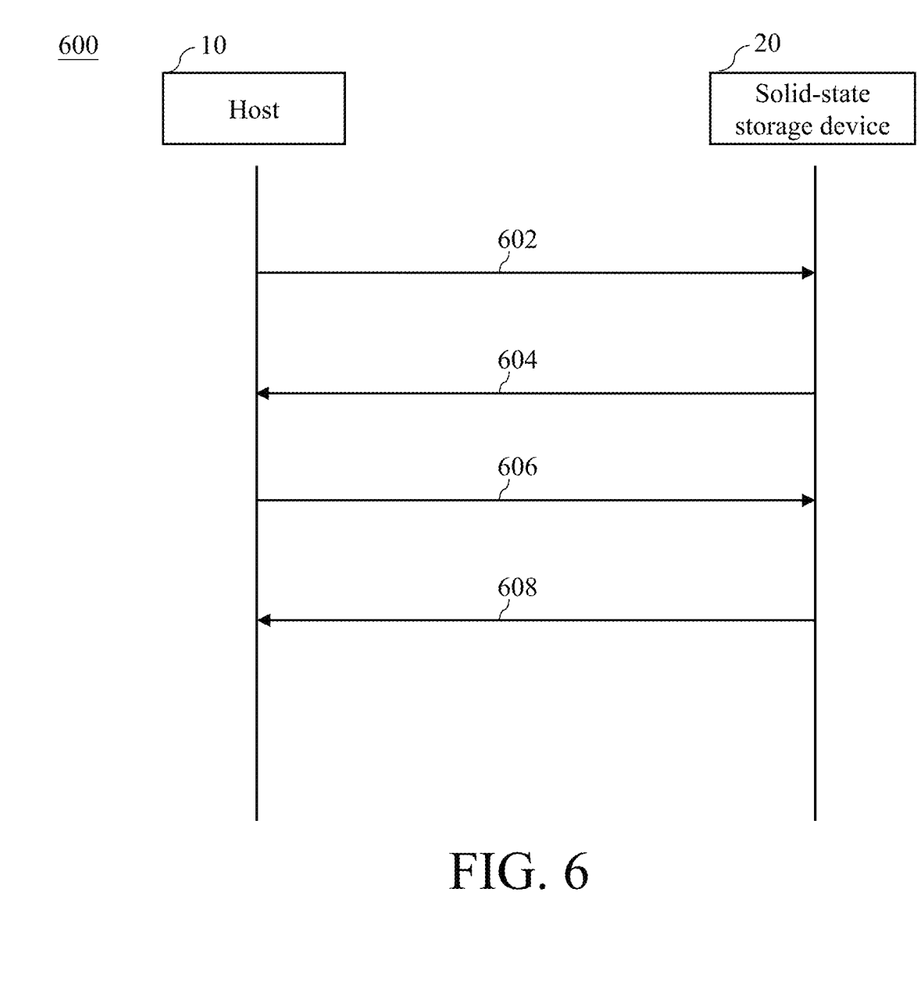
FIG. 6 is a flowchart of obtaining TX/RX link quality information by a host according to an embodiment of the present disclosure.

Step 602: The host 10 transmits a first configuration read packet with a first address offset to the solid-state storage device 20. The first address offset may be 0xE4, which is a start address offset of a first error count value in the PCIe capability structure 306.

Step 604: The solid-state storage device 20 transmits a first data completion packet to the host 10 in response to the first configuration read packet. The first data completion packet may be, for example, a completion with data transaction layer packet defined in the PCIe standard. For example, when the solid-state storage device 20 receives the first configuration read packet, the error counter circuit 250 may load a first error count value of the error counter 251 (e.g., a TX error counter) into register 2121, and the PCIe MAC layer 210 may package the numerical value stored in the register 2121 into the first data completion packet and transmits the first data completion packet to the host 10.

Step 606: The host 10 transmits a second configuration read packet with a second address offset to the solid-state storage device 20. The second address offset may be 0xE8, which is a start address offset of the second error count value in the PCIe capability structure 306.

Step 608: The solid-state storage device 20 transmits a second data completion packet to the host 10 in response to the second configuration read packet. The second data completion packet may be, for example, a completion with data transaction layer packet defined in the PCIe standard. For example, when the solid-state storage device 20 receives the second configuration read packet, the error counter circuit 250 may load the second error count value of the error counter 252 (e.g., an RX error counter) into the register 2122, and the PCIe MAC layer 210 may package the numerical values stored in the register 2122 into the second data completion packet and transmit the second data completion packet to the host 10.

Figure 7:
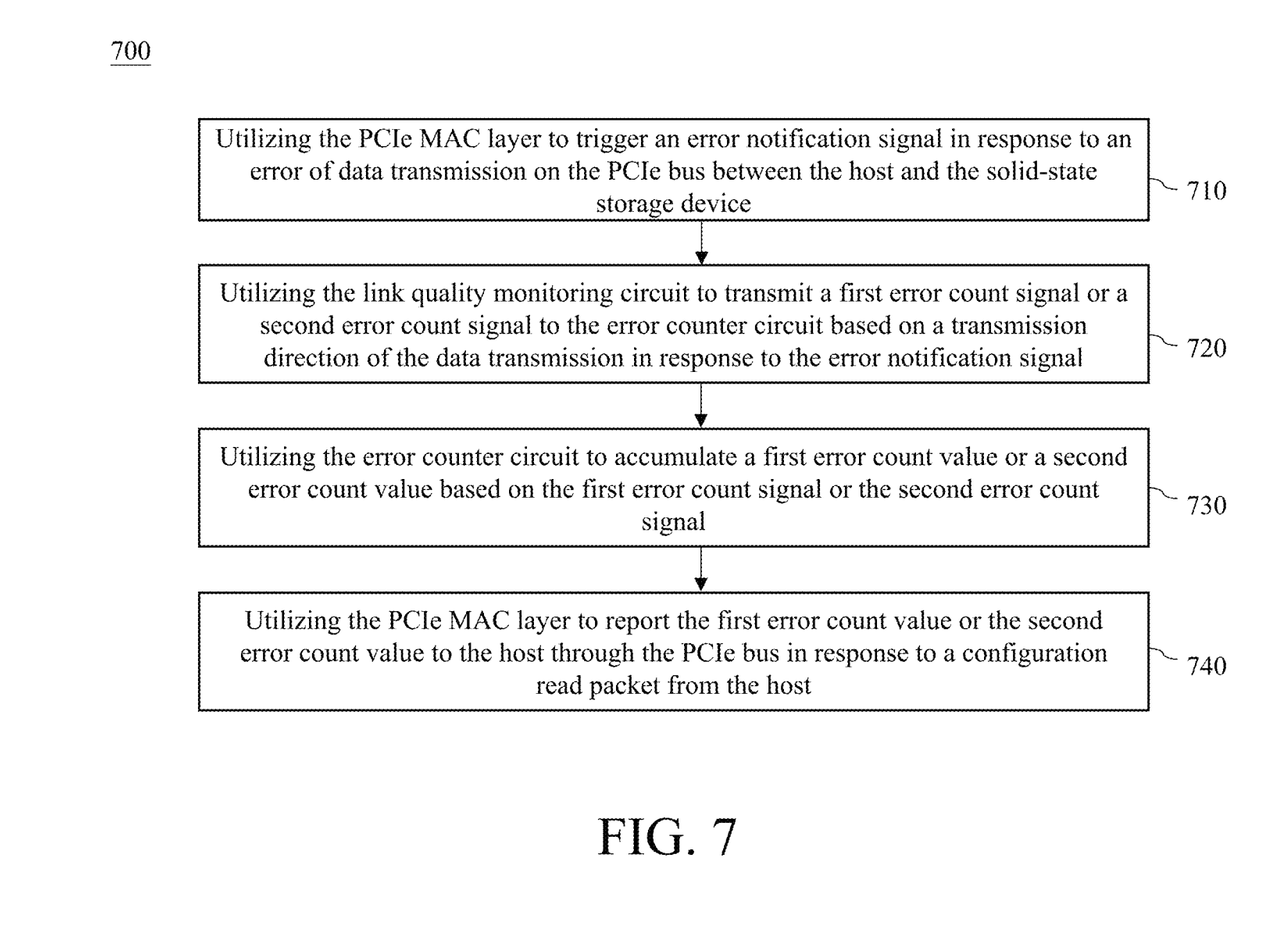
FIG. 7 is a flowchart of a method for monitoring link signal quality of a solid-state storage device according to an embodiment of the present disclosure.

FIG. 7 is a flowchart of a method for monitoring link signal quality of a solid-state storage device according to an embodiment of the present disclosure. Refer to FIG. 1 and FIG. 7 together.

Step 710: Triggering an error notification signal 215 by the PCIe MAC layer 210 in response to an error of data transmission on the PCIe bus 15 between the host 10 and the solid-state storage device 20. For example, the error may occur on link 16 or 17 of the PCIe bus 15. When the PCIe MAC layer 210 detects an error of data transmission on link 16 or 17, the state machine 211 transitions from the L0 state to the recovery state. In response to the state machine 211 transitioning from the L0 state to the recovery state, the state machine 211 triggers the error notification signal 215 (e.g., a pulse signal), and transmits the error notification signal to the link quality monitoring circuit 240.

Step 720: In response to the error notification signal 215, transmitting a first error count signal 241 or a second error count signal 242 to the error counter circuit 250 based on a transmission direction of the data transmission by the link quality monitoring circuit 240. For example, when the link quality monitoring circuit 240 receives the error notification signal 215, if the signals 231 and 232 are respectively in the high logic state and the low logic state, it indicates that the memory controller 200 transmits data read from the flash memory 30 to the host 10 in a first transmission direction through link 17. In this case, the link quality monitoring circuit 240 triggers the first error count signal 241, and transmits the first error count signal 241 to the error counter circuit 250. When the link quality monitoring circuit 240 receives the error notification signal 215, if the signals 231 and 232 are respectively in the low logic state and the high logic state, it indicates that the memory controller 200 fetches write data from the memory unit 120 of the host 10 in the second transmission direction through link 16. In this case, the link quality monitoring circuit 240 triggers the second error count signal 242, and transmits the second error count signal 242 to the error counter circuit 250.

Step 730: utilizing the error counter circuit 250 to accumulate a first error count value or a second error count value based on the first error count signal 241 or the second error count signal 242. For example, when the error counter circuit 250 receives the first error count signal 241, the error counter 251 (e.g., a TX error counter) in the error counter circuit 250 accumulates the first error count value (e.g., a TX error count value) based on the first error count signal 241. When the error counter circuit 250 receives the second error count signal 242, the error counter 252 (e.g., an RX error counter) in the error counter circuit 250 accumulates the second error count value (e.g., an RX error count value) based on the second error count signal 242.

Step 740: Utilizing the PCIe MAC layer 210 to reporting the first error count value or the second error count value to the host 10 through the PCIe bus 15 in response to a configuration read packet from the host 10. For example, when the configuration read packet received by the solid-state storage device 20 carries a start address (e.g., 0xE4) of the first error count value, the error counter circuit 250 loads the first error count value of the error counter 251 (e.g., the TX error counter) into register 2121, and the PCIe MAC layer 210 packages the numerical value stored in the register 2121 into a first data completion packet and transmits the first data completion packet to the host 10. When the configuration read packet received by the solid-state storage device 20 carries a start address (e.g., 0xE8) of the second error count value, the error counter circuit 250 loads the second error count value of the error counter 252 (for example, the RX error counter) into register 2122, and the numerical value stored in register 2122 is reported to the host 10 as a data completion packet.

In view of the above, the memory controller, the solid-state storage device, and the method for monitoring link signal quality of a solid-state storage device provided in the present disclosure are capable of detecting a data error during data transmission between the host and the solid-state storage device through the PCIe bus by the PCIe MAC layer in the solid-state storage device. Additionally, the corresponding TX/RX error count value may be calculated based on different transmission directions. Moreover, the solid-state storage device supports the vendor-specific capability for reporting the TX/RX error count value, and the host may actively transmit the configuration read packet to the solid-state storage device through the PCIe bus to read the TX error count value or the RX error count value, allowing the host to learn the link signal quality information between the host and the solid-state storage device, such as a total number of errors that have occurred on the PCIe link or a number of errors that have occurred on the PCIe link within a specific time interval. Therefore, when it is determined that the link signal quality is poor, the host may actively take the corresponding link adjustment measure such as pre-emphasis, de-emphasis, and use of a feed-forward equalizer, a continuous-time linear equalizer, and a decision feedback equalizer to improve the link signal quantity.

Although the present disclosure has been disclosed above with preferred embodiments, the preferred embodiments are not intended to limit the scope of the present disclosure. Any person of ordinary skill in the art may make some changes and modifications without departing from the spirit and scope of the present disclosure. Therefore, the protection scope of the present disclosure is subject to that defined in the appended claims.

What is claimed is:

1. A memory controller, electrically connected to a host through a peripheral component interconnect express (PCIe) bus, the memory controller comprising:
   a PCIe media access control (MAC) layer, configured to trigger an error notification signal in response to an error of data transmission on the PCIe bus;
   a non-volatile memory express (NVMe) conversion circuit, configured to convert a PCIe signal from the PCIe MAC layer into an NVMe signal;
   a flash memory control circuit, configured to control data access of a flash memory based on the NVMe signal;
   a link quality monitoring circuit, electrically connected to the flash memory control circuit and the PCIe MAC layer, wherein the link quality monitoring circuit is configured to generate a first error count signal or a second error count signal based on a transmission direction of the data transmission in response to the error notification signal; and
   an error counter circuit, electrically connected to the link quality monitoring circuit, and configured to accumulate a first error count value or a second error count value based on the first error count signal or the second error count signal,
   wherein in response to a configuration read packet with a specific address from the host, the error counter circuit loads the first error count value or the second error count value into a first register or a second register of the PCIe MAC layer, and the PCIe MAC layer reports the first error count value or the second error count value to the host through the PCIe bus.

2. The memory controller according to claim 1, wherein the PCIe bus comprises a first link having a first transmission direction and a second link having a second transmission direction, the first transmission direction is from the memory controller to the host, and the second transmission direction is from the host to the memory controller.

3. The memory controller according to claim 2, wherein when an access command fetched from a submission queue of the host and executed by the memory controller is a read command, the PCIe MAC layer or the flash memory control circuit determines that the transmission direction is the first transmission direction; and
when the access command fetched from the submission queue of the host and executed by the memory controller is a write command, the PCIe MAC layer or the flash memory control circuit determines that the transmission direction is the second transmission direction.

4. The memory controller according to claim 3, wherein the first transmission direction and the second transmission direction are respectively represented by a first signal and a second signal generated by the flash memory control circuit, or respectively represented by a third signal and a fourth signal generated by the PCIe MAC layer.

5. The memory controller according to claim 2, wherein the PCIe MAC layer comprises a link training and status state machine (LTSSM), and the LTSSM transitions from a normal transmission state to a recovery state and triggers the error notification signal in response to the error of the data transmission on the first link or the second link.

6. The memory controller according to claim 5, wherein in response to the error notification signal,
the link quality monitoring circuit generates the first error count signal when the transmission direction of the data transmission is the first transmission direction; and
the link quality monitoring circuit generates the second error count signal when the transmission direction of the data transmission is the second transmission direction.

7. The memory controller according to claim 6, wherein the error counter circuit comprises:
   a first counter, configured to accumulate the first error count value in response to the first error count signal; and
   a second counter, configured to accumulate the second error count value in response to the second error count signal.

8. The memory controller according to claim 2, wherein a PCIe configuration space of the PCIe MAC layer comprises a PCIe capability structure, the PCIe capability structure is configured to define that the memory controller supports a vendor-specific capability for reporting the first error count value and the second error count value, and the PCIe capability structure comprises the first register and the second register.

9. The memory controller according to claim 8, wherein when the specific address of the configuration read packet points to the first register, the error counter circuit loads the first error count value into the first register, and the PCIe MAC layer packages the first error count value stored in the first register into a first data completion packet, and reports the first data completion packet to the host through the PCIe bus; and
when the specific address of the configuration read packet points to the second register, the error counter circuit loads the second error count value into the second register, and the PCIe MAC layer packages the second error count value stored in the second register into a second data completion packet, and reports the second data completion packet to the host through the PCIe bus.

10. The memory controller according to claim 9, wherein the configuration read packet is a configuration read transaction layer packet in the PCIe protocol, and the first data completion packet and the second data completion packet are completion with data transaction layer packets in the PCIe protocol.

11. A method for monitoring link signal quality of a solid-state storage device, wherein the solid-state storage device is electrically connected to a host through a peripheral component interconnect express (PCIe) bus, and a memory controller of the solid-state storage device comprises a PCIe media access control (MAC) layer, a flash memory control circuit, a link quality monitoring circuit, and an error counter circuit, the method comprising:
   utilizing the PCIe MAC layer to trigger an error notification signal in response to an error of data transmission on the PCIe bus between the host and the solid-state storage device;
   utilizing the link quality monitoring circuit to transmit a first error count signal or a second error count signal to the error counter circuit based on a transmission direction of the data transmission in response to the error notification signal;
   utilizing the error counter circuit to accumulate a first error count value or a second error count value based on the first error count signal or the second error count signal; and
   utilizing the error counter circuit to load the first error count value or the second error count value into a first register or a second register of the PCIe MAC layer, and utilizing the PCIe MAC layer to report the first error count value or the second error count value to the host through the PCIe bus in response to a configuration read packet from the host.

12. The method according to claim 11, wherein the PCIe bus comprises a first link having a first transmission direction and a second link having a second transmission direction, the first transmission direction being a direction from the memory controller to the host, and the second transmission direction being a direction from the host to the memory controller.

13. The method according to claim 12, further comprising:
   utilizing the PCIe MAC layer or the flash memory control circuit to determine that the transmission direction is the first transmission direction when an access command fetched from a submission queue of the host and executed by the memory controller is a read command; and
   utilizing the PCIe MAC layer or the flash memory control circuit to determine that the transmission direction is the second transmission direction when the access command fetched from the submission queue of the host and executed by the memory controller is a write command.

14. The method according to claim 13, wherein the first transmission direction and the second transmission direction are respectively represented by a first signal and a second signal generated by the flash memory control circuit, or respectively represented by a third signal and a fourth signal generated by the PCIe MAC layer.

15. The method according to claim 12, wherein the PCIe MAC layer comprises a link training and status state machine (LTSSM), and in response to the error of the data transmission over the first link or the second link, and the method further comprises: controlling the LTSSM to switch from a normal transmission state to a recovery state, and triggering the error notification signal.

16. The method according to claim 15, further comprising:
   in response to the error notification signal,
   utilizing the link quality monitoring circuit to generate the first error count signal when the transmission direction of the data transmission is the first transmission direction; and
   utilizing the link quality monitoring circuit to generate the second error count signal when the transmission direction of the data transmission is the second transmission direction.

17. The method according to claim 12, wherein a PCIe configuration space of the PCIe MAC layer comprises a PCIe capability structure, the PCIe capability structure is configured to define that the solid-state storage device supports a vendor-specific capability of reporting the first error count value and the second error count value, and the PCIe capability structure comprises the first register and the second register.

18. The method according to claim 17, further comprising:
   in response to a specific address of the configuration read packet pointing to the first register, utilizing the error counter circuit to load the first error count value into the first register, and utilizing the PCIe MAC layer to package the first error count value stored in the first register into a first data completion packet by the PCIe MAC layer, and to report the first data completion packet to the host through the PCIe bus; and
   in response to the specific address of the configuration read packet pointing to the second register, utilizing the error counter circuit to load the second error count value into the first register, and utilizing the PCIe MAC layer to package the second error count value stored in the second register into a second data completion packet, and to report the second data completion packet to the host through the PCIe bus.

19. The method according to claim 18, wherein the configuration read packet is a configuration read transaction layer packet in the PCIe protocol, and the first data completion packet and the second data completion packet are completion with data transaction layer packets in the PCIe protocol.

20. A solid-state storage device, electrically connected to a host through a peripheral component interconnect express (PCIe) bus, and the solid-state storage device comprising:
   a flash memory; and
   a memory controller, electrically connected to the flash memory, wherein the memory controller comprises:
      a PCIe media access control (MAC) layer, configured to trigger an error notification signal in response to an error of data transmission on the PCIe bus;
      a non-volatile memory express (NVMe) conversion circuit, configured to convert a PCIe signal from the PCIe MAC layer into an NVMe signal;
      a flash memory control circuit, configured to control data access of a flash memory based on the NVMe signal;
      a link quality monitoring circuit, electrically connected to the flash memory control circuit and the PCIe MAC layer, wherein the link quality monitoring circuit is configured to generate a first error count signal or a second error count signal based on a transmission direction of the data transmission in response to the error notification signal; and
      an error counter circuit, electrically connected to the link quality monitoring circuit, wherein the error counter circuit is configured to accumulate a first error count value or a second error count value based on the first error count signal or the second error count signal, and wherein in response to a configuration read packet with a specific address from the host, the error counter circuit is configured to load the first error count value or the second error count value into a first register or a second register, and report the first error count value or the second error count value to the host through the PCIe bus.

* * * * *